Sept. 2, 1969 E. R. MURPHY ET AL 3,465,254

ULTRAHIGH FREQUENCY PHASE SHIFTER

Filed Nov. 29, 1965

INVENTORS
EARL R. MURPHY
PHILIP L. SHELTON
BY Mueller Aichele and Rauner
ATTORNEYS

United States Patent Office 3,465,254

Patented Sept. 2, 1969

3,465,254

ULTRAHIGH FREQUENCY PHASE SHIFTER

Earl R. Murphy and Philip L. Shelton, Scottsdale, Ariz., assignors to Motorola, Inc., Franklin Park, Ill., a corporation of Illinois Filed Nov. 29, 1965, Ser. No. 510,302

Int. Cl. H04b *1/16*

U.S. Cl. 325—376 11 Claims

ABSTRACT OF THE DISCLOSURE

A system for shifting the phase of an ultrahigh frequency signal including a negative feedback transistor coupled to the incoming ultrahigh frequency signal and means connected to the negative feedback transistor to vary the DC bias thereon. The amount of phase insertion introduced into the incoming ultrahigh frequency signal is controlled by varying the current flow in the negative feedback transistor.

The present invention relates generally to phase shifters and more particularly to a high frequency phase shifting network adapted to be integrated with an antenna device.

Prior art phase shifting networks include bulky ferrite devices, mechanical line stretchers, complicated mixer circuits, varactor diodes and digital phase shifting networks employing PIN diodes. All of these devices have limited applications with integrated antenna structures due to size and complexity. In the case of varactors, the phase shift per element is small and the power handling capabilities are low. In addition, prior art integrated antenna and phase shift devices operate at less than half the 300 megacycle frequency received by the circuits of the invention to be described and obtain less than half the phase shift provided by the present invention.

An object of the invention is to provide an improved electronic phase shift circuit capable of introducing maximum phase shift in UHF (ultrahigh frequency) signals independent of signal frequency.

Another object of the invention is to provide a single transistorized phase shift stage capable of introducing approximately 180° phase shift in signals applied thereto.

A further object of the invention is to provide an improved system for controlling the phase shift and gain of UHF signals received by integrated high frequency antenna structure.

A feature of the present invention is the provision of a negative feedback transistorized phase control circuit adapted to be integrated with a high frequency antenna for producing phase insertion in high frequency signals received by the antenna.

Another feature of the invention is the provision of a variable bias control element connected in said transistorized phase control circuit for varying transistor current flow in order to control the insertion phase introduced into the incoming UHF signal.

Another feature of the invention is the provision of an amplifier circuit coupling an antenna to the transistorized phase insertion network for compensating for the insertion losses in the phase insertion network.

The invention is illustrated in the accompanying drawings wherein.

Briefly described, the invention includes three integrated sections: (1) a UHF antenna for receiving the incoming signal, (2) a negative feedback transistor circuit for producing phase insertion in the incoming UHF signal, and (3) an RF amplifier circuit coupling the antenna to the transistorized phase insertion circuit for increasing the gain of the incoming signal to compensate for insertion losses in the phase insertion circuit.

The antenna is the resonant circuit for the first stage of RF amplification and this eliminates losses which are normally associated with a transmission line and an additional tuned circuit at the input of the RF amplifier. A variable bias network is connected in the RF amplifier circuit for controlling the circuit gain over a range of −15 db to +2 db while maintaining the phase of the incoming signal constant. Another variable bias network is connected in the transistorized phase insertion circuit for providing approximately 180° of insertion phase shift per transistor stage at 300 megacycles.

Figure 1:
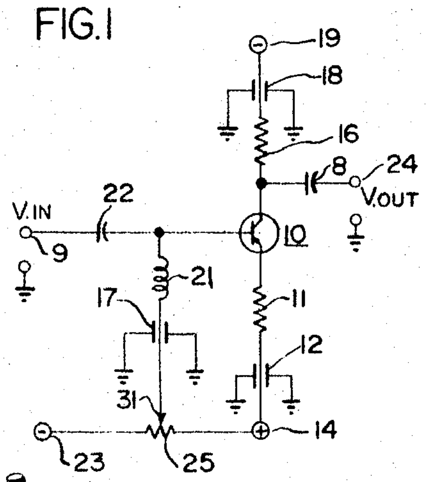
FIG. 1 is the basic transistorized phase insertion network of the invention.

The basic negative feedback transistor phase shift circuit of the invention is shown in FIG. 1 and includes a PNP transistor 10 capacitively coupled at 22 to an input terminal 9. An emitter bias resistor 11 is connected between the emitter and a positive voltage supplying terminal 14, and a load resistor 16 is connected between the collector and a negative voltage supply terminal 19. The incoming UHF signal, into which phase insertion is to be introduced, is coupled to the base of transistor 10 and the phase shifted output signal is taken from the transistor collector and coupled through capacitor 8 to output terminal 24.

A bias control potentiometer 25 is connected between the positive voltage supply terminal 14 and a negative voltage supply terminal 23, and the movable tap 31 thereon is connected through the high frequency choke 21 to the bias of transistor 10. By varying the position of the tap 31 on the potentiometer 25, the base-emitter bias on transistor 10 is varied to control the flow of transistor base current. A variation in current flow in the transistor introduces phase shift into the incoming signal and this is graphically illustrated in FIG. 2. Small capacitors 12, 18 and 17 are connected as shown in FIG. 1 to keep all high frequency signals out of the voltage supplies.

Figure 2:
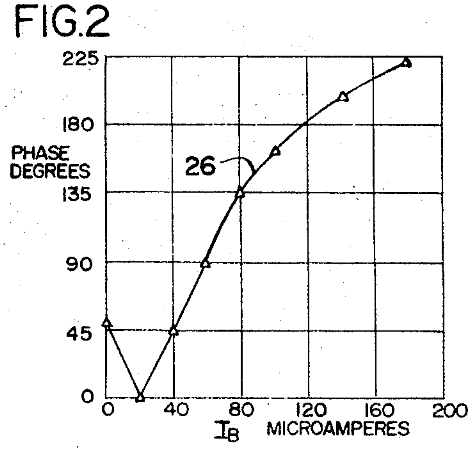
FIG. 2 is a plot of insertion phase as a function of the base current in the transistor shown in FIG. 1.

Using the circuit parameters given in Table I below, a plot of insertion phase as a function of transistor 10 base current was obtained (FIG. 2). The experimental data curve 26 in FIG. 2 shows that when the base current of transistor 10 is increased from zero to 180 microamperes, the insertion phase approaches 225°. If 360° of phase shift is required, two or more of the circuits shown in FIG. 1 should be cascaded.

The theoretical value of the insertion phase for various values of $I_B$ can be obtained by writing loop equations for the circuit of FIG. 1 taking into consideration the input loop with inductor 21 and capacitor 22, the emitter-base or input circuit of transistor 10 and the collector or output circuit including the IR voltage drop across load resistor 16. These loop equations can be written after first measuring the parameters of the transistor 10. The voltage gain $V_{out}/V_{in}$ is obtained after solving the loop equations to determine output current, and values of voltage gain are expressed as complex quantities. The vector angles derived from theoretical calculations compared favorably with those of the experimental data curve 26 in FIG. 2.

The insertion losses in the phase insertion stage or stages used, depending upon the phase shift required, are compensated for by an RF amplifier connected between the antenna and the input to the phase insertion stage. This RF amplifier may have as many transistor stages as are necessary to compensate for the insertion losses in the phase insertion stage. The maximum input VSWR for a maximum phase variation for the transistor stage in FIG. 1 is about 3 to 1 and the maximum insertion loss is approximately 4.0 db.

Figure 3:
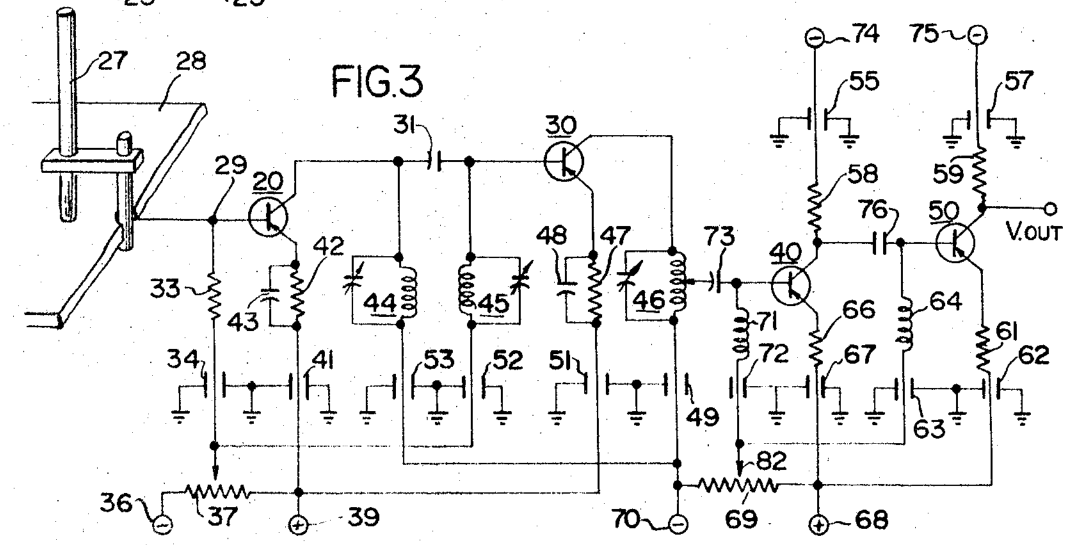
FIG. 3 is a transistorized phase and gain control system, including the circuit in FIG. 1, connected to a gamma matched monopole antenna.

The circuit shown in FIG. 3 includes a pair of transistors 20 and 30 in the RF amplifier circuit and a pair of phase shift transistors 40 and 50 in the phase insertion circuit. The antenna 27, which is constructed on the ground plane 28, is the resonant circuit for the first stage of amplification and is connected directly to the base of the PNP transistor 20. The PNP amplifier transistors 20 and 30 are connected in cascade through capacitor 31, and each amplifier transistor stage includes a high frequency tuned circuit 44, 46 in the respective output circuit to enhance the frequency selectivity in the amplifier circuit. These LC circuits 44 and 46 are tuned to a resonant frequency of the incoming signal. An interstage LC circuit 45 which is also tuned to the incoming signal frequency is connected between the base of transistor 30 and gain control potentiometer 37 to improve the overall Q of the amplifier circuit, as well as provide a DC path from the voltage supply 36 to the base of transistor 30.

The transistors 20 and 30 are coupled at their respective emitters through parallel RC connections 42, 43 and 47, 48 to the positive voltage supply 39, and all of the connections in FIG. 3 from the transistors 20 and 30 to the voltage supplies include a capacitive coupling to ground through the very small capacitors 34, 41, 53, 52, 51 and 49.

The voltage tapped from potentiometer 37 is coupled through bias resistor 33 to the base of transistor 20, and through the inductance in the tuned circuit 45 to the base of transistor 30 in order that the gain in each of these cascaded transistors may be simultaneously varied. In a similar fashion, the negative voltage supply 70 is connected through the inductance portions of the tuned circuits 44 and 46 to the collectors of transistors 20 and 30 in order to provide an overall forward bias for these transistors for class A operation.

The incoming RF signal is amplified in transistor stages 20 and 30 and is coupled from the output of resonant tank 46 through capacitor 73 to the base of phase shift transistor 40. Transistor stages 40 and 50 are identical to the phase shift stage shown in the circuit of FIG. 1 and these transistors are connected collector-to-base through the coupling capacitor 76. Transistors 40 and 50 are connected to the positive voltage supply 68 through emitter resistors 66 and 61, and to the negative voltage supplies 74 and 75 through load resistors 58 and 59. A pair of RF chokes 71 and 64 are connected from the potentiometer 69 to the respective bases of transistors 40 and 50. The cascaded phase shift stages, like the preceding amplifier stages, are capacitively coupled at 55, 57, 62, 67 and 72 to ground to permit any high frequencies from reaching the voltage supplies.

The phase control potentiometer 69 is connected between positive and negative voltage supplies 68 and 70 in a connection similar to that of the gain control potentiometer 37 in the RF amplifier stage. The respective bases of transistors 40 and 50 which are connected to the movable tap 82 on the bias control potentiometer 69 each receive an identical adjustable bias. By moving the potentiometer tap 82 to the extreme left to place a maximum forward bias on the bases of transistors 40 and 50, a maximum phase insertion for the 300 megacycle UHF signal can be obtained.

Figure 4:
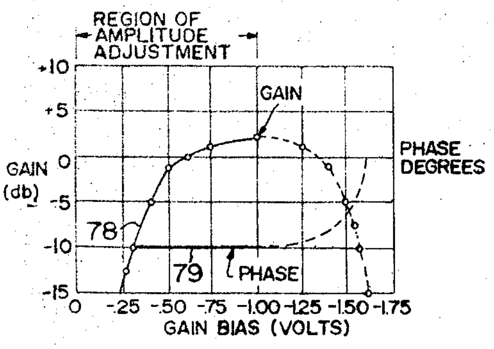
FIG. 4 illustrates the gain control of the circuit of FIG. 3 for a given range of gain bias, while maintaining a constant phase for the incoming UHF signal.
Figure 5:
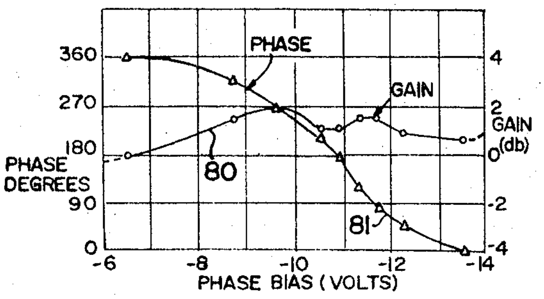
FIG. 5 illustrates the phase insertion versus phase bias characteristic of the circuit of FIG. 3 (and shows stage gain constant to ±1 db).

FIG. 4 shows the variation of phase and gain for a 300 megacycle signal as a function of gain bias at potentiometer 37 and FIG. 5 shows the variation of phase and gain with a variation in phase bias at potentiometer 69. By varying the gain bias from −.25 to −1.0 volt, the gain of the entire amplifier stage may be raised from −15 db to approximately +2 db. In this voltage range the phase of the incoming 300 megacycle signal is constant. As the value of the negative voltage bias is increased from −1.0 volt to approximately −1.67 volts, the amplifier gain begins to decrease, and the phase of the incoming signal will eventually begin to change exponentially. However, there is no reason for increasing the gain bias beyond −1.0 volt.

An insertion phase of 360° was obtained (FIG. 5) for the circuit in FIG. 3 by varying the phase bias from −6 volts to approximately −13.4 volts. Over this range and operating at 300 megacycles the gain was constant to ±1 db, which is an acceptable variation in overall circuit gain. Using the circuit of FIG. 3, gain fluctuations of ±1.5 db have been maintained for a 360° phase shift at frequencies ranging between 280 and 310 megacycles. These amplitude fluctuations are caused by the tuned circuits in the RF amplifier stage and the inherent amplitude variations of the phase shift stage.

When the integrated antenna and phase shifter arrangement in FIG. 3 was used in its receiving mode, the total noise figure for the entire arrangement was approximately 6.4 db.

The following table includes various component values for the embodiment of the invention shown in FIGS. 1 and 3. However, this table should not be construed as limiting the scope of the invention.

Table I

| | |
|---|---|
| Transistors **10, 20, 30, 40, 50** | TI2N2997. |
| Resistor **33** | 2200 ohms. |
| Capacitors **12, 17, 18, 34, 41, 49, 51, 52, 53, 62, 63, 67, 72, 75** | 1000 picofarads. |
| Inductors **64, 71** | 0.1 microhenry, cutoff frequency $F_0 > 400$ mc. |
| Capacitors **43, 48** | .002 microfarad. |
| Resistors **42, 47** | 100 ohms. |
| Tank circuits **44, 45, 46** | Resonant frequency= 300 megacycles. |
| Capacitor **31** | 100 picofarads. |
| Resistor **37** | 10K. |
| Capacitors **22, 73** | 100 picofarads. |
| Resistors **25, 69** | 10K. |
| Inductors **21, 64, 71** | 0.1 microhenry. |
| Resistors **16, 58, 59** | 390 ohms. |
| Resistors **11, 61, 66** | 820 ohms. |
| Capacitor **76** | 100 picofarads. |

The invention described above provides an improved integrated antenna phase array which includes a simple and independent control for both signal, amplitude and phase. The invention is suited for various beacon and locator applications, and the simplicity and size of the gain and phase control circuits relative to that of ferrite devices, mechanical line stretchers and the like make them particularly attractive for use in large phased arrays where space requirements are an important factor. The phase shifting section of the system, while of ingenious design is of relatively simple construction and can be successfully operated up to frequencies of 450 megacycles.

The invention described above is primarily oriented towards use as an element of phased array receiving antenna. However, the basic phase shifting circuit can be used as a high power RF amplifier driver in transmitting applications, providing an input matching device or isolator is used to make the device compatible with RF transmitter systems.

We claim:

1. A system for shifting the phase of ultrahigh frequency signals including in combination:

(a) means for receiving an ultrahigh frequency signal, (b) means including a negative feedback transistor amplifier coupled to said receiving means for producing a substantial amount of phase insertion in said ultrahigh frequency signal, and (c) a first variable bias means connected to said phase insertion producing means for changing the current flow in said negative feedback transistor to vary the current through said negative feedback transistor and to thereby control the insertion phase introduced into said ultrahigh frequency signal.

2. The system according to claim 1 wherein (a) said first variable bias means includes a potentiometer connected between a first voltage supply and the base of said transistor for varying the current flowing in said transistor, and (b) said system further including a load resistor connected between the output electrode of said transistor and a second voltage supply.

3. The system according to claim 2 which further includes:

(a) capacitance means connected between said first and second voltage supplies and ground for filtering any high frequency signals tending to enter the first and second voltage supplies, and (b) an RF choke connected between said potentiometer and the control electrode of said transistor.

4. The system according to claim 1 wherein:

(a) said negative feedback transistor has input, output and control electrodes and an unbypassed resistor in the input circuit thereof, (b) said first variable bias means includes resistance means connected to a first source of supply voltage and between the control and input electrodes of said transistor, and (c) means for changing the value of said resistance means to vary the current flow in said transistor and to shift the phase of said ultrahigh frequency signal approximately 180°.

5. The system according to claim 4 wherein said receiving means includes means for controlling the gain of said ultrahigh frequency signal prior to phase insertion to compensate for the insertion loss experienced by said signal when undergoing a phase change.

6. The system according to claim 5 wherein said receiving means includes a gamma matched monopole antenna connected to the input of said gain control means for receiving high frequency signals.

7. The system of claim 5 wherein said gain control means includes:

(a) a high frequency transistor amplifier connected between an antenna and said phase insertion producing means, said transistor amplifier having input, output and control electrodes, and (b) a second variable bias means connected between said control and said input electrodes of said high frequency amplifier for varying the current flowing therein for controlling the gain of said ultrahigh frequency signal.

8. A system according to claim 5 wherein said gain control means includes:

(a) a pair of transistors each having input, output and control electrodes and connected in cascade for providing a signal path for high frequency signals, (b) a parallel resistance-capacitance network connected between the input electrode of each of said transistors and a second source of supply voltage, (c) second variable bias means connected between said second supply voltage and the control electrode of each of said pair of transistors for controlling the current flow therein, (d) a first and second inductance capacitance tank circuit connected respectively between the output electrodes of said pair of transistors and a third supply voltage, and (e) capacitance means connected between said second and third supply voltages and ground for preventing high frequency signals from reaching said second and third supply voltages.

9. The system according to claim 8 which further includes another phase insertion producing means including a second negative feedback emitter follower transistor connected in cascade with the output of said gain control means and the input of the other phase insertion producing means for doubling phase insertion introduced into said ultrahigh frequency signals to a value of approximately 360°.

10. A system for shifting the phase of ultrahigh frequency signals including in combination:

(a) means for receiving an ultrahigh frequency signal, (b) a transistor coupled to said receiving means for introducing a phase shift into said incoming ultrahigh frequency signal, and (c) means DC coupled to said transistor for varying the DC bias thereon to thereby vary the current flow through said transistor and in turn vary the amount of phase shift introduced into said incoming ultrahigh frequency signal.

11. The system defined in claim 10 wherein said means for varying the DC bias on said transistor includes means connected to the base of said transistor for varying the base current in said transistor and thereby varying the phase shift introduced into said incoming ultrahigh frequency signal.

References Cited

UNITED STATES PATENTS

| | | | |
|---|---|---|---|
| 2,948,869 | 8/1960 | Bigelow -------- | 330—107 XR |
| 2,971,161 | 2/1961 | Clevenger ------ | 330—107 XR |
| 3,112,451 | 11/1963 | Collins ------------- | 328—155 |
| 3,204,192 | 8/1965 | Barditch et al. ---- | 330—107 XR |
| 3,356,865 | 12/1967 | Woster --------- | 328—155 XR |

RICHARD MURRAY, Acting Primary Examiner

R. S. BELL, Assistant Examiner

U.S. Cl. X.R.

325—369; 328—155; 330—26; 333—29